United States Patent
Luo et al.

(10) Patent No.: US 11,419,181 B2
(45) Date of Patent: Aug. 16, 2022

(54) DEVICE CONTROL METHOD AND APPARATUS, STORAGE MEDIUM, PROCESSOR, AND TERMINAL

(71) Applicant: CONSUMER LIGHTING (U.S.), LLC, Norwalk, CT (US)

(72) Inventors: Xin Luo, Shanghai (CN); Zhiyong Wang, Shanghai (CN); Aijun Wang, Shanghai (CN); Shangqing Wei, Shanghai (CN); Yiming Wang, Shanghai (CN)

(73) Assignee: SAVANT TECHNOLOGIES LLC, Norwalk, CT (US)

( * ) Notice: Subject to any disclaimer, the term of this patent is extended or adjusted under 35 U.S.C. 154(b) by 202 days.

(21) Appl. No.: 16/936,369

(22) Filed: Jul. 22, 2020

(65) Prior Publication Data
US 2021/0045190 A1    Feb. 11, 2021

(30) Foreign Application Priority Data
Aug. 5, 2019 (CN) .......................... 201910718270.9

(51) Int. Cl.
*H04W 4/00* (2018.01)
*H04W 84/18* (2009.01)
(Continued)

(52) U.S. Cl.
CPC ............ *H04W 84/18* (2013.01); *H04W 4/80* (2018.02); *H04W 8/005* (2013.01); *H04W 76/10* (2018.02)

(58) Field of Classification Search
CPC ..... H04W 84/18; H04W 8/005; H04W 76/10; H04W 4/80; H04W 8/00
(Continued)

(56) References Cited

U.S. PATENT DOCUMENTS

| | | | | |
|---|---|---|---|---|
| 2011/0195701 A1* | 8/2011 | Cook | ..... | H04W 4/029 455/422.1 |
| 2013/0115888 A1* | 5/2013 | Tipton | ..... | H04B 17/318 455/67.11 |

(Continued)

*Primary Examiner* — Marceau Milord
(74) *Attorney, Agent, or Firm* — Wood IP LLC

(57) ABSTRACT

The application relates to a device control method and apparatus, a storage medium, a processor, a terminal, and a computer program product. The device control method includes: detecting multiple devices, wherein each of the multiple devices has a data network connection module and a Bluetooth connection module, each device can establish a connection with a wireless network node through the respective data network connection module, and the multiple devices are connected to each other in a Bluetooth network through the respective Bluetooth connection modules; acquiring the signal strength of each device in the multiple devices to establish a connection with the wireless network node through the respective data network connection modules; determining one or more first devices with the highest signal strength in the multiple devices; controlling one or more first devices to establish a connection with the wireless network node through the data network connection module; and deactivating or idling the data network connection modules of other devices than the first device in the multiple devices. The technical solution of the application can effectively reduce the load of wireless network nodes.

15 Claims, 5 Drawing Sheets

(51) Int. Cl.
*H04W 8/00* (2009.01)
*H04W 76/10* (2018.01)
*H04W 4/80* (2018.01)

(58) Field of Classification Search
USPC ........................................................ 370/329
See application file for complete search history.

(56) References Cited

U.S. PATENT DOCUMENTS

| | | | |
|---|---|---|---|
| 2014/0323049 A1* | 10/2014 | Park | H04W 76/10 |
| | | | 455/41.2 |
| 2016/0253651 A1* | 9/2016 | Park | G06Q 20/322 |
| | | | 705/39 |
| 2017/0134223 A1* | 5/2017 | Ahmed | H04W 12/068 |
| 2017/0201854 A1* | 7/2017 | Choi | H04W 72/0406 |
| 2019/0158469 A1* | 5/2019 | Gonzalez | H04W 12/06 |
| 2019/0347916 A1* | 11/2019 | Wild | H04L 12/4625 |
| 2019/0373469 A1* | 12/2019 | Bradley | H04W 12/0433 |
| 2020/0260287 A1* | 8/2020 | Hendel | H04L 9/0894 |

* cited by examiner

DEVICE CONTROL METHOD AND APPARATUS, STORAGE MEDIUM, PROCESSOR, AND TERMINAL

TECHNICAL FIELD

The application relates to the field of communication. Specifically, the application relates to a device control method and apparatus, a storage medium, a processor, and a terminal.

BACKGROUND

A Bluetooth Low Energy Mesh Network (BLE Mesh) may be well used for local device control, for example, the interaction between local devices in a local area network. At the same time, WiFi networks may provide devices with the ability to access the Internet. A network chip of a WiFi and Bluetooth dual-mode network device can provide both WiFi and Bluetooth network functions.

In a Bluetooth network composed of multiple network devices, each network device may have both a WiFi network function and a Bluetooth network function. All network devices in the Bluetooth network form a local network through the BLE Mesh network, and communicate with each other through the Bluetooth function. In addition, each network device can be connected to a wireless router through its WiFi network function to access the Internet.

However, the number of WiFi device connections that can be supported by a wireless router is limited, that is, each wireless router can only support a limited number of WiFi device connections. If there are too many devices that need to be connected to the Internet via WiFi, problems will be caused. In addition, in all local network devices, not all network devices can be stably connected to the wireless router, for example, this depends on the WiFi signal strength of the network device and the wireless router. In practical applications, not all network devices need to access the Internet through the wireless router, and not all network devices have good WiFi signal strength to communicate with the wireless router.

SUMMARY

The embodiments of the application provide a device control method and apparatus, a storage medium, a processor, and a terminal, which are intended to at least solve the problem in the conventional art of limited number of WiFi device connections that can be supported by a wireless router.

According to an aspect of the embodiments of the application, a device control method is provided, which includes that: multiple devices are detected, wherein each of the multiple devices has a data network connection module and a Bluetooth connection module, each device is capable of establishing a connection with a wireless network node through the respective data network connection module, and the multiple devices are connected to each other in a Bluetooth network through the respective Bluetooth connection modules; the signal strength of each device in the multiple devices to establish a connection with the wireless network node through the respective data network connection modules is acquired; one or more first devices in the multiple devices with the highest signal strength to establish a connection with the wireless network node through the respective data network connection modules are determined; the one or more first devices are controlled to establish a connection with the wireless network node through the data network connection module; and the data network connection modules of other devices than the first device in the multiple devices are deactivated or idled.

In this way, only one or more devices with the highest signal strength of the wireless network node in the multiple devices establish a connection with the wireless network node, and all the multiple devices are connected to each other through a Bluetooth network, thereby reducing the load of the wireless network node.

According to an exemplary embodiment of the application, the method further includes that: after the one or more first devices establish a connection with the wireless network node, it is detected whether at least one of the one or more first devices is powered off; if the at least one first device is powered off, at least one second device with the highest signal strength to establish a connection with the wireless network node through the respective data network connection modules among devices other than the powered-off first devices in all the multiple devices is determined, wherein the number of the determined second devices is equal to that of the powered-off first devices; and the second device is controlled to establish a connection with the wireless network node through the data network connection module.

In this way, when the device establishing a connection with the wireless network node is powered off, it can be re-determined that another device with a high signal strength of the wireless network node replaces the powered-off device to establish a connection with the wireless network node, and the number of connections with the wireless network node is maintained.

According to an exemplary embodiment of the application, the device establishing a connection with the wireless network node is configured to acquire data from the Internet via the wireless network node.

In this way, network data is acquired from the Internet. According to an exemplary embodiment of the application, the multiple devices are configured to share the data acquired via the wireless network node through the Bluetooth network.

In this way, all devices in the Bluetooth network may acquire the Internet network data.

According to an exemplary embodiment of the application, the data network connection module is a WIFI connection module having a WIFI connection function, and the wireless network node is a WIFI router.

In this way, the load on the WiFi router is reduced.

According to an exemplary embodiment of the application, the data network connection module is a connection module having at least one connection function of 4G, 5G, NB-IoT, and LoRa, and the wireless network node is a communication base station.

In this way, it is not necessary for all devices in the Bluetooth network to be connected to the Internet, and network data of all devices may be shared only through at least one communication network of 4G, 5G, NB-IoT, and LoRa of one or more network devices.

According to another aspect of the embodiments of the application, a device control apparatus is further provided, which includes: a device detection module, configured to detect multiple devices, wherein each of the multiple devices has a data network connection module and a Bluetooth connection module, each device is capable of establishing a connection with a wireless network node through the respective data network connection module, and the multiple devices are connected to each other in a Bluetooth network through the respective Bluetooth connection modules; a signal strength acquisition module, configured to acquire the signal strength of each device in the multiple devices to establish a connection with the wireless network node through the respective data network connection modules; a connection device determination module, configured to determine one or more first devices in the multiple devices with the highest signal strength to establish a connection with the wireless network node through the respective data network connection modules; a connection control module, configured to control the one or more first devices to establish a connection with the wireless network node through the data network connection module; and a data network control module, configured to deactivate or idle the data network connection modules of other devices than the first device in the multiple devices.

In this way, only one or more devices with the highest signal strength of the wireless network node in the multiple devices establish a connection with the wireless network node, and all the multiple devices are connected to each other through a Bluetooth network, thereby reducing the load of the wireless network node.

According to an exemplary embodiment of the application, the apparatus further includes: a power-off detection module, configured to detect, after the one or more first devices establish a connection with the wireless network node, whether at least one of the one or more first devices is powered off. If the at least one first device is powered off, the connection device determination module determines at least one second device with the highest signal strength to establish a connection with the wireless network node through the respective data network connection modules among devices other than the powered-off first devices in the multiple devices, the number of the determined second devices being equal to that of the powered-off first devices. The connection control module controls the second device to establish a connection with the wireless network node through the data network connection module.

In this way, when the device establishing a connection with the wireless network node is powered off, it can be re-determined that another device with a high signal strength of the wireless network node replaces the powered-off device to establish a connection with the wireless network node, and the number of connections with the wireless network node is maintained.

According to an exemplary embodiment of the application, the device establishing a connection with the wireless network node is configured to acquire data from the Internet via the wireless network node.

In this way, network data is acquired from the Internet.

According to an exemplary embodiment of the application, the multiple devices are configured to share the data acquired via the wireless network node through the Bluetooth network.

In this way, all devices in the Bluetooth network may acquire the Internet network data.

According to an exemplary embodiment of the application, the data network connection module is a WIFI connection module having a WIFI connection function, and the wireless network node is a WIFI router.

In this way, the load on the WiFi router is reduced.

According to an exemplary embodiment of the application, the data network connection module is a connection module having at least one connection function of 4G, 5G, NB-IoT, and LoRa, and the wireless network node is a communication base station.

In this way, it is not necessary for all devices in the Bluetooth network to be connected to the Internet, and network data of all devices may be shared only through at least one communication network of 4G, 5G, NB-IoT, and LoRa of one or more network devices.

According to another aspect of the embodiments of the application, a storage medium is further provided, which includes a stored program. When the program is run, a device where the storage medium is located is controlled to perform any of the aforementioned methods.

According to another aspect of the embodiments of the application, a processor is further provided. The processor is configured to run a program. When run, the program performs any of the aforementioned methods.

According to another aspect of the embodiments of the application, a terminal is further provided. The terminal includes one or more processors, a memory, and one or more programs. The one or more programs are stored in the memory, and configured to be executed by the one or more processors. When executed, the one or more programs cause the one or more processors to perform any of the aforementioned methods.

According to another aspect of the embodiments of the application, a computer program product is further provided. The computer program product is tangibly stored on a computer-readable medium and includes computer-executable instructions that, when executed, cause at least one processor to perform any of the aforementioned methods.

In this way, only one or more devices with the highest signal strength of the wireless network node in the multiple devices establish a connection with the wireless network node, and all the multiple devices are connected to each other through a Bluetooth network, thereby reducing the load of the wireless network node.

In the embodiments of the application, a technical solution is provided in which one or more devices in a Bluetooth network are connected to a wireless network node, and other devices do not need to establish a connection with the wireless network node. In this technical solution, a device with the highest signal strength of a wireless network node establishes a connection with the wireless network node. When the device that has been connected to the wireless network node is powered off, another device with a better signal can be automatically activated to replace the powered-off device to establish a connection with the wireless network node, so as to ensure the number of devices that establish a connection with the wireless network node, thereby at least solving the technical problem that wireless devices connected with the wireless network node are limited and not all devices can stably establish a connection with the wireless network node to acquire network data, and achieving the technical effects of improving the network connection efficiency, improving the efficiency of a network device and enhancing the stability of acquiring network data by all devices in a Bluetooth network.

BRIEF DESCRIPTION OF THE DRAWINGS

The accompanying drawings described herein are used to provide a further understanding of the application, and constitute a part of the application, and the exemplary embodiments of the application and the description thereof are used to explain the application, but do not constitute improper limitations to the application. In the drawings.

DETAILED DESCRIPTION OF THE EMBODIMENTS

Figure 1:
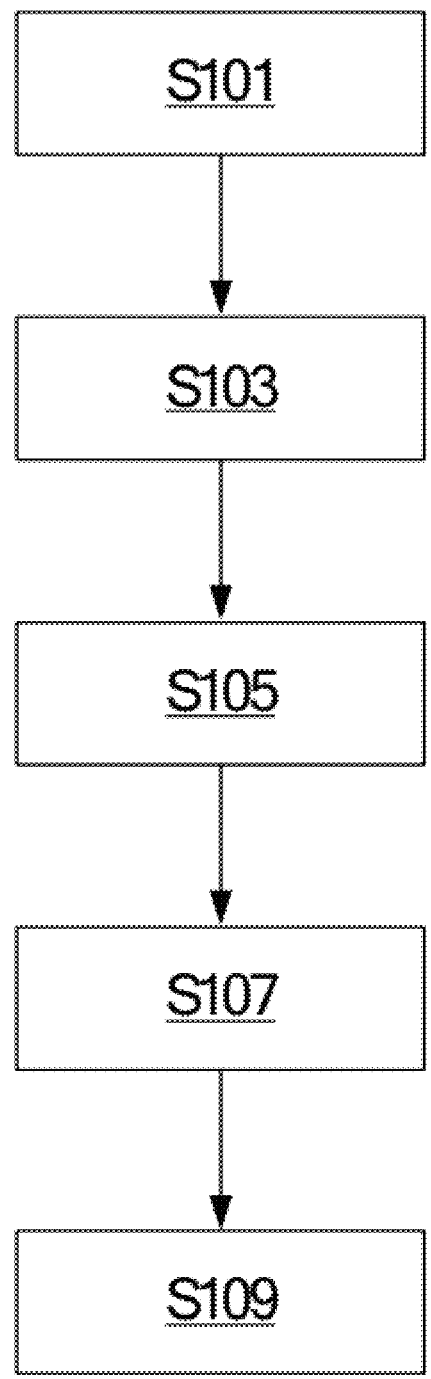
FIG. 1 is a flowchart of a device control method according to an embodiment of the application.

In order to make those skilled in the art better understand the solutions of the application, the technical solutions in the embodiments of the application will be clearly and completely described below with reference to the drawings in the embodiments of the application. It is apparent that the described embodiments are only a part of the embodiments of the application, not all of the embodiments. All other embodiments obtained by those of ordinary skill in the art based on the embodiments of the application without creative efforts should fall within the scope of protection of the application.

It is to be noted that the specification and claims of the application and the terms "first", "second" and the like in the drawings are used to distinguish similar objects, and do not need to describe a specific sequence or a precedence order. It will be appreciated that data used in such a way may be exchanged under appropriate conditions, in order that the embodiments of the application described here can be implemented in a sequence other than sequences graphically shown or described here. In addition, terms "include" and "have" and any variations thereof are intended to cover non-exclusive inclusions. For example, it is not limited for processes, methods, systems, products or devices containing a series of steps or modules or units to clearly list those steps or modules or units, and other steps or modules or units which are not clearly listed or are inherent to these processes, methods, products or devices may be included instead.

Figure 2:
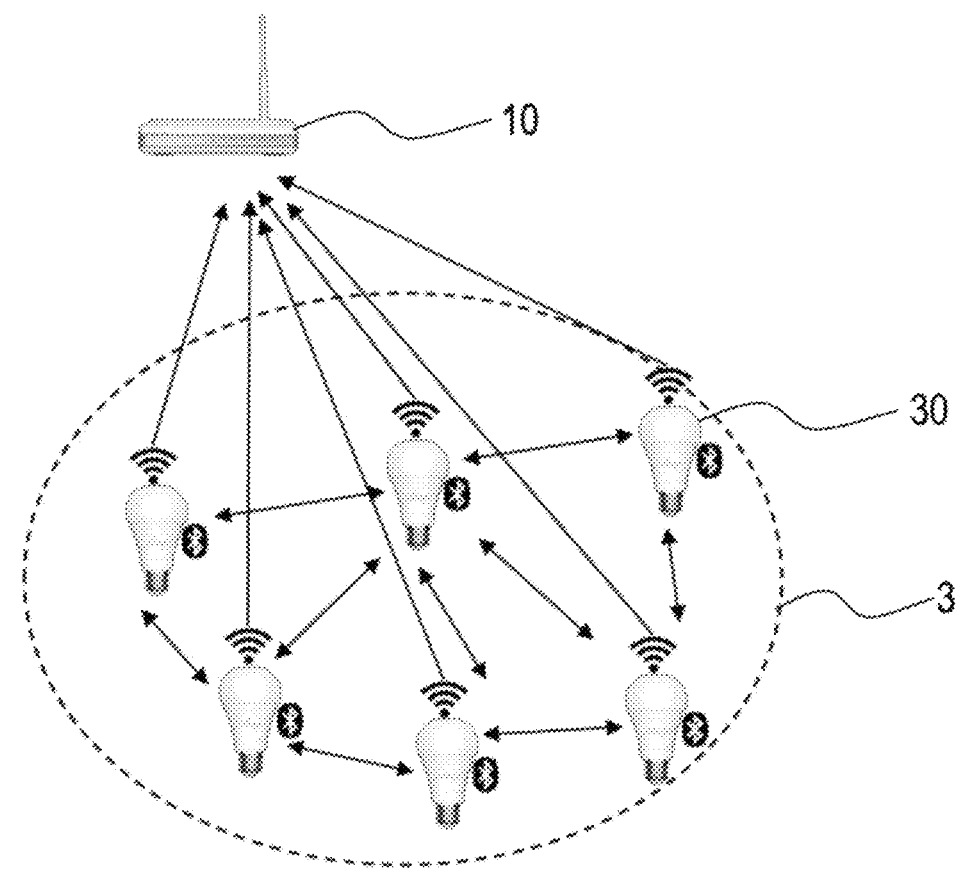
FIG. 2 is a schematic diagram of a traditional Bluetooth network.

FIG. 2 is a schematic diagram of a traditional Bluetooth network. As shown in FIG. 2, in a Bluetooth network 3 composed of multiple devices 30, each device 30 may have both a WiFi network function and a Bluetooth network function. All devices 30 in the Bluetooth network form a local network through a BLE Mesh network, and communicate with each other through a Bluetooth function. In addition, each device 30 can be connected to a wireless router 10 through its WiFi network function to access the Internet.

According to an embodiment of the application, a device control method is provided. FIG. 1 is a flowchart of a device control method according to an embodiment of the application. As shown in FIG. 1, the device control method includes the following steps. In step S101, multiple devices are detected. Each of the multiple devices has a data network connection module and a Bluetooth connection module, each device is capable of establishing a connection with a wireless network node through the respective data network connection module, and the multiple devices are connected to each other in a Bluetooth network through the respective Bluetooth connection modules. In step S103, the signal strength of each device in the multiple devices to establish a connection with the wireless network node through the respective data network connection modules is acquired. In step S105, one or more first devices in the multiple devices with the highest signal strength to establish a connection with the wireless network node through the respective data network connection modules are determined. In step S107, the one or more first devices are controlled to establish a connection with the wireless network node through the data network connection module. In step S109, the data network connection modules of other devices than the first device in the multiple devices are deactivated or idled.

Figure 3:
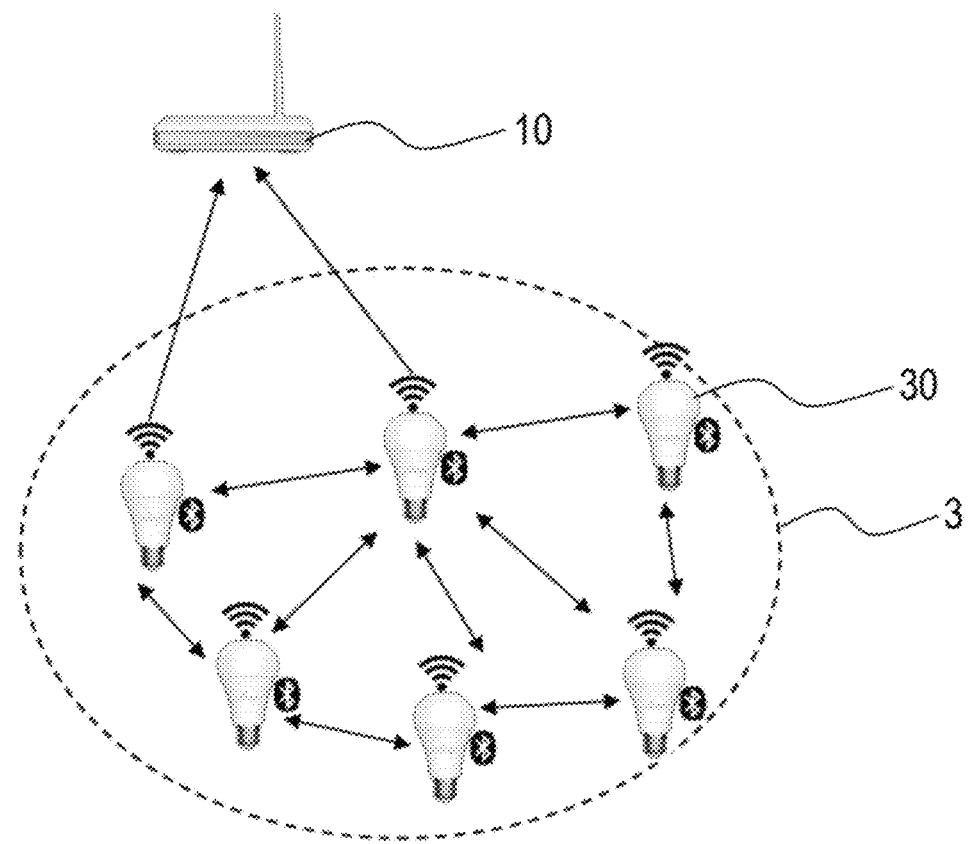
FIG. 3 is a schematic diagram of a Bluetooth network according to an exemplary embodiment of the application.

FIG. 3 is a schematic diagram of a Bluetooth network according to an exemplary embodiment of the application. As shown in FIG. 3, multiple devices 30 form a local Bluetooth network 3 through the Bluetooth network function, and each device 30 establishes a Bluetooth connection with other devices 30. The device 30 also has a WiFi connection function, so that a WiFi connection can be established with a wireless router 10. The wireless router 10 is a wireless network node. However, in an exemplary embodiment of the application, it is not necessary to connect all the devices 30 to the wireless router 10 simultaneously, but only two devices 30 are used to be connected to the wireless router 10.

As shown in FIG. 3, the two devices 30 connected to the wireless router 10 are selected from all the devices. Since the strength of a signal of the wireless router 10 that can be received by each device 30 is different, the two devices with the highest received signal strength of the wireless router 10 establish a connection with the wireless router 10 to obtain a relatively stable WiFi network connection. Therefore, the two devices 30 that establish a connection with the wireless router 10 are the two devices with the highest received signal strength of the wireless router 10. In the present embodiment, only the technical solution in which two devices are simultaneously connected to the wireless router 10 is shown. It should be understood that the number of devices 30 connected to the wireless router 10 may be one or more, as long as the number of devices 30 connected to the wireless router 10 is significantly less than the number of all devices. In the two devices 30 connected to the wireless router 10 shown in FIG. 3, one of the devices may be used as a main connection device, and the other device may be used as a backup device, thereby providing redundancy for the network connection.

In this way, only one or more devices with the highest signal strength of the wireless network node in the multiple devices establish a connection with the wireless network node, and all the multiple devices are connected to each other through a Bluetooth network, thereby reducing the load of the wireless network node.

Figure 4:
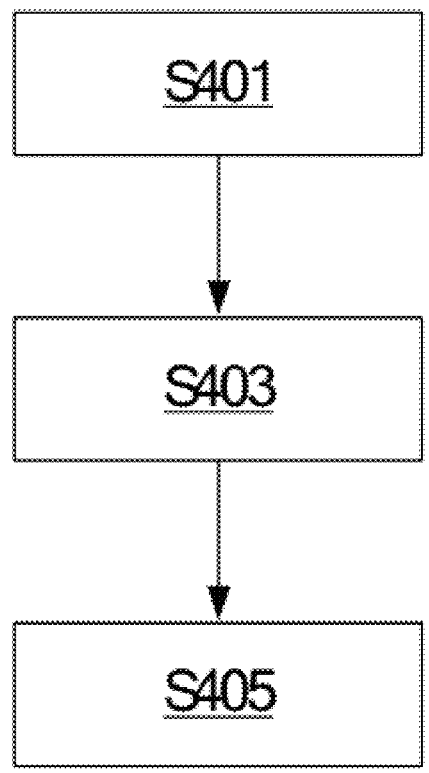
FIG. 4 is a flowchart of a device control method according to an exemplary embodiment of the application.

FIG. 4 is a flowchart of a device control method according to an exemplary embodiment of the application. As shown in FIG. 4, the method according to the exemplary embodiment of the application further includes step S401 in which after the one or more first devices establish a connection with the wireless network node, it is detected whether at least one of the one or more first devices is powered off. If the at least one first device is powered off, step S401 is performed to determine at least one second device with the highest signal strength to establish a connection with the wireless network node through the respective data network connection modules among devices other than the powered-off first devices in the multiple devices. The number of the determined second devices is equal to that of the powered-off first devices. Next, step S401 is performed to control the second device to establish a connection with the wireless network node through the data network connection module.

For example, as shown in FIG. 3, when the two devices 30 that have been connected to the wireless router 10, one of the devices is powered off due to damage or failure, so that the number of devices 30 connected to the wireless router 10 is reduced and data cannot be effectively acquired from the wireless router 10. At this time, the device with the highest received signal strength of the wireless router 10 is determined from other devices 30 that are not connected to the wireless router 10, thereby replacing the powered-off device to continue to maintain the network connection with the wireless router 10, and maintaining the number of devices 30 connected to the wireless router 10 in the Bluetooth network unchanged.

In this way, when the device establishing a connection with the wireless network node is powered off, it can be re-determined that another device with a high signal strength of the wireless network node replaces the powered-off device to establish a connection with the wireless network node, and the number of connections with the wireless network node is maintained.

According to an exemplary embodiment of the application, the device establishing a connection with the wireless network node is configured to acquire data from the Internet via the wireless network node.

According to an exemplary embodiment of the application, the multiple devices are configured to share the data acquired via the wireless network node through the Bluetooth network.

According to an exemplary embodiment of the application, the data network connection module is a WIFI connection module having a WIFI connection function, and the wireless network node is a WIFI router.

In this way, two devices connected to the wireless router acquire Internet data from a WiFi router. All devices in the Bluetooth network may share data with each other to acquire Internet network data. Therefore, it is not necessary for all devices to establish simultaneously a connection with the WiFi router, and the load on the WiFi router is reduced.

According to an exemplary embodiment of the application, the data network connection module is a connection module having at least one connection function of 4G, 5G, NB-IoT, and LoRa, and the wireless network node is a communication base station. In the present embodiment, it is different from the embodiment shown in FIG. 3 in that the device 30 acquires network data via a communication base station through at least one communication network of 4G, 5G, NB-IoT (narrowband Internet of Things), and LoRa (long-range radio). In this case, for example, one or more devices 30 are enabled to establish at least one communication connection among 4G, 5G, NB-IoT, and LoRa, network data is acquired from the communication base station through at least one communication network of 4G, 5G, NB-IoT, and LoRa, all devices 30 establish a local network connection through Bluetooth, and each device 30 shares network data with each other through the Bluetooth network.

In this way, it is not necessary for all devices in the Bluetooth network to be connected to the Internet, and network data of all devices may be shared only through at least one communication network of 4G, 5G, NB-IoT, and LoRa of one or more network devices.

Figure 5:
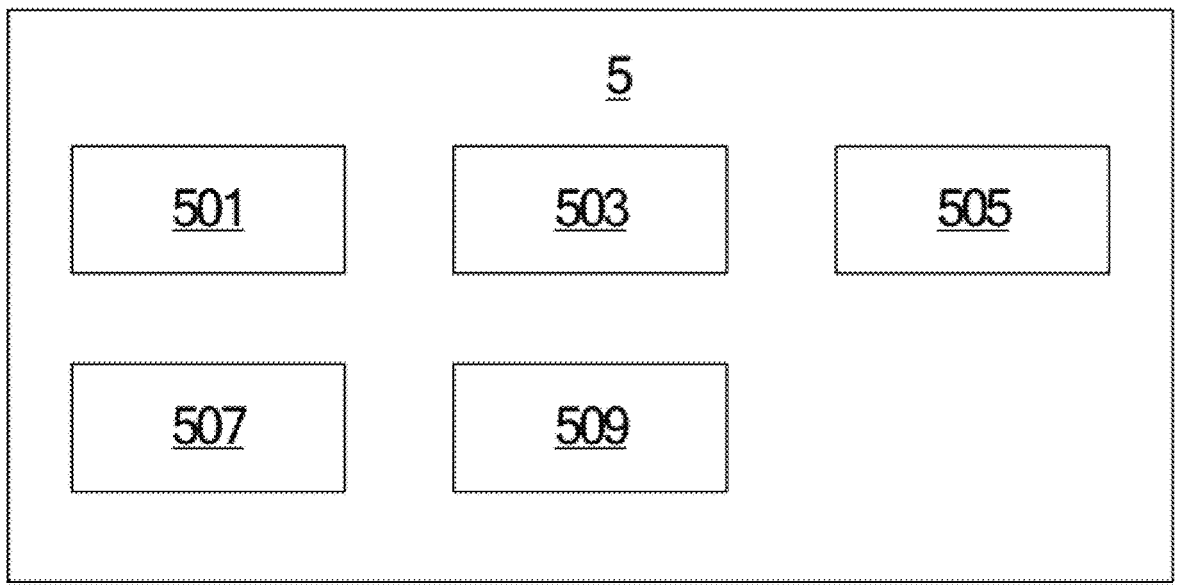
FIG. 5 is a schematic diagram of a device control apparatus according to an embodiment of the application.

According to an embodiment of the application, a device control apparatus is further provided. FIG. 5 is a schematic diagram of a device control apparatus according to an embodiment of the application. As shown in FIG. 5, a device control apparatus 5 includes: a device detection module 501, a signal strength acquisition module 503, a connection device determination module 505, a connection control module 507, and a data network control module 509. The device detection module 501 is configured to detect multiple devices. Each of the multiple devices has a data network connection module and a Bluetooth connection module. Each device is capable of establishing a connection with a wireless network node through the respective data network connection module. The multiple devices are connected to each other in a Bluetooth network through the respective Bluetooth connection modules. The signal strength acquisition module 503 is configured to acquire the signal strength of each device in the multiple devices to establish a connection with the wireless network node through the respective data network connection modules. The connection device determination module 505 is configured to determine one or more first devices in the multiple devices with the highest signal strength to establish a connection with the wireless network node through the respective data network connection modules. The connection control module 507 is configured to control the one or more first devices to establish a connection with the wireless network node through the data network connection module. The data network control module 509 is configured to deactivate or idle the data network connection modules of other devices than the first device in the multiple devices.

In this way, only one or more devices with the highest signal strength of the wireless network node in the multiple devices establish a connection with the wireless network node, and all the multiple devices are connected to each other through a Bluetooth network, thereby reducing the load of the wireless network node.

Figure 6:
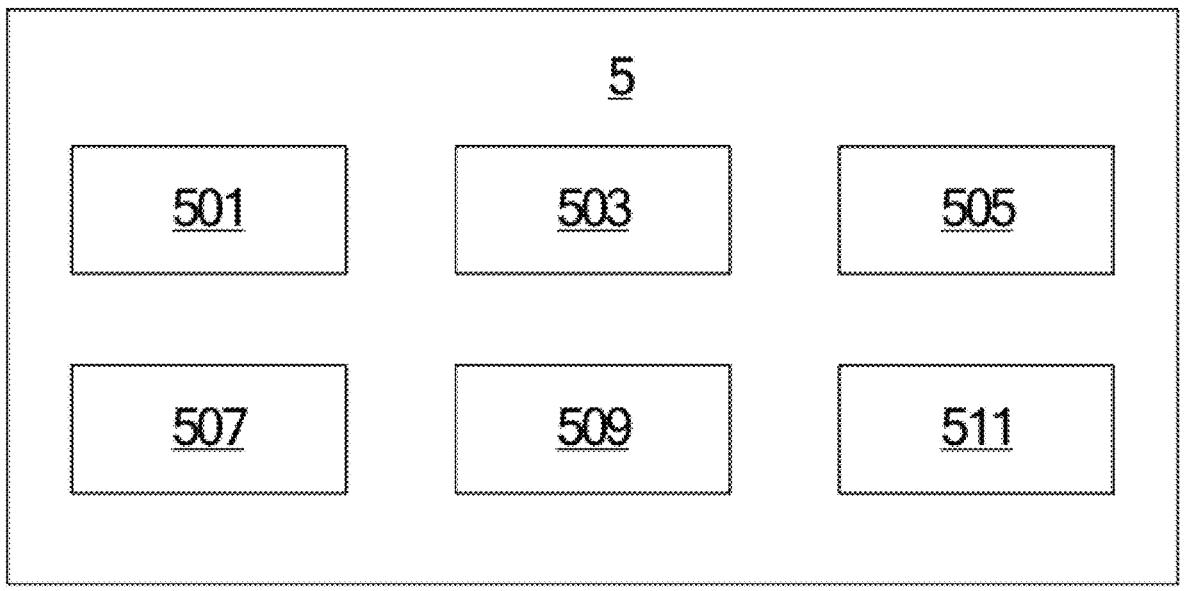
FIG. 6 is a schematic diagram of a device control apparatus according to an exemplary embodiment of the application.

FIG. 6 is a schematic diagram of a device control apparatus according to an exemplary embodiment of the application. As shown in FIG. 6, according to the exemplary embodiment of the application, the apparatus 5 further includes: a power-off detection module 511, configured to detect, after the one or more first devices establish a connection with the wireless network node, whether at least one of the one or more first devices is powered off. If the at least one first device is powered off, the connection device determination module 505 determines at least one second device with the highest signal strength to establish a connection with the wireless network node through the respective data network connection modules among devices other than the powered-off first devices in the multiple devices, the number of the determined second devices being equal to that of the powered-off first devices. Then, the connection control module 507 controls the second device to establish a connection with the wireless network node through the data network connection module.

In this way, when the device establishing a connection with the wireless network node is powered off, it can be re-determined that another device with a high signal strength of the wireless network node replaces the powered-off device to establish a connection with the wireless network node, and the number of connections with the wireless network node is maintained.

According to an exemplary embodiment of the application, the device establishing a connection with the wireless network node is configured to acquire data from the Internet via the wireless network node. In this way, network data is acquired from the Internet.

According to an exemplary embodiment of the application, the multiple devices are configured to share the data acquired via the wireless network node through the Bluetooth network. In this way, all devices in the Bluetooth network may acquire the Internet network data.

According to an exemplary embodiment of the application, the data network connection module is a WIFI connection module having a WIFI connection function, and the wireless network node is a WIFI router. In this way, the load on the WiFi router is reduced.

According to an exemplary embodiment of the application, the data network connection module is a connection module having at least one connection function of 4G, 5G, NB-IoT, and LoRa, and the wireless network node is a communication base station. In this way, it is not necessary for all devices in the Bluetooth network to be connected to the Internet, and network data of all devices may be shared only through at least one communication network of 4G, 5G, NB-IoT, and LoRa of one or more network devices.

A control device according to an embodiment of the application can perform the device control method according to an embodiment of the application as described above, and the descriptions are omitted herein.

According to an embodiment of the application, the device control method and apparatus can also be implemented in the following manners.

A storage medium includes a stored program. When the program is run, a device where the storage medium is located is controlled to perform the above method.

A processor is configured to run a program. When run, the program performs the above method.

A terminal includes one or more processors, a memory, and one or more programs. The one or more programs are stored in the memory, and configured to be executed by the one or more processors. When executed, the one or more programs cause the one or more processors to perform the above method.

A computer program product is tangibly stored on a computer-readable medium and includes computer-executable instructions that, when executed, cause at least one processor to perform the above method.

In this way, only one or more devices with the highest signal strength of the wireless network node in the multiple devices establish a connection with the wireless network node, and all the multiple devices are connected to each other through a Bluetooth network, thereby reducing the load of the wireless network node.

In the application, a dual-mode chip with Wifi and Bluetooth functions uses Bluetooth for local networking and Wifi for Internet access. In the application, not all devices are needed to be connected to a router or the Internet, and one or two devices may share network data with all devices. A certain device or some certain devices in the Bluetooth network may be automatically managed to be connected to the router or the Internet, and one or more devices connected to the router have a stronger router Wifi signal (RSSI) than other devices. If one or more devices connected to the router or the Internet are powered off, other devices in the Bluetooth network turn on the Wifi function and are connected to the router.

In the above embodiments of the application, descriptions of each embodiment are emphasized respectively, and parts which are not elaborated in detail in a certain embodiment may refer to relevant descriptions of other embodiments.

In several embodiments provided by the application, it is to be understood that the disclosed technical content may be implemented in other manners. The apparatus embodiments described above are merely illustrative. For example, the division of the unit or module is only a logical function division. In actual implementation, there may be another division manner, for example, multiple units or modules may be combined or integrated into another system, or some features may be ignored or not executed. In addition, the coupling or direct coupling or communication connection shown or discussed may be an indirect coupling or communication connection through some interfaces, modules or units, and may be electrical or otherwise.

The units or modules described as separate components may or may not be physically separated, and the members displayed as units or modules may or may not be physical units or modules, that is, may be located in one place, or may be distributed to multiple network units or modules. Some or all of the units or modules may be selected according to actual needs to achieve the purpose of the solution of the present embodiment.

In addition, each functional unit or module in each embodiment of the application may be integrated into a processing unit or module, each unit or module may also physically exist independently, and two or more than two units or modules may also be integrated into a unit or module. The integrated unit or module may be implemented in a hardware form and may also be implemented in the form of a software functional unit or module.

The integrated unit may be stored in a computer-readable storage medium if being implemented in the form of a software functional unit and sold or used as a standalone product. Based on such an understanding, the technical solution of the application, which is essential or contributes to the conventional art, may be embodied in the form of a software product. The computer software product is stored in a storage medium, including a number of instructions for causing a terminal device (which may be a personal computer, a server, or a network device, etc.) to perform all or part of the steps of the methods described in various embodiments of the application. The foregoing storage medium includes: a U disk, a Read-Only Memory (ROM), a Random Access Memory (RAM), a mobile hard disk, a magnetic disk, or an optical disk, and the like, which may store a program code.

The above is a preferred implementation of the application. It is to be noted that a number of modifications and refinements may be made by those of ordinary skill in the art without departing from the principles of the application, and such modifications and refinements are also considered to be within the scope of protection of the application.

What is claimed is:

1. A device control method, comprising:
   detecting a plurality of devices, wherein each of the plurality of devices has a data network connection module and a Bluetooth connection module, each device is capable of establishing a connection with a wireless network node through the respective data network connection module, and the plurality of devices are connected to each other in a Bluetooth network through the respective Bluetooth connection modules;
   acquiring the signal strength of each device in the plurality of devices to establish a connection with the wireless network node through the respective data network connection modules;
   determining one or more first devices in the plurality of devices with the highest signal strength to establish a connection with the wireless network node through the respective data network connection modules;
   controlling the one or more first devices to establish a connection with the wireless network node through the data network connection module; and deactivating or idling the data network connection modules of other devices than the first device in the plurality of devices.

2. The method of claim 1, further comprising:

detecting, after the one or more first devices establish a connection with the wireless network node, whether at least one of the one or more first devices is powered off;

determining, if the at least one first device is powered off, at least one second device with the highest signal strength to establish a connection with the wireless network node through the respective data network connection modules among devices other than the powered-off first devices in the plurality of devices, wherein the number of the determined second devices is equal to that of the powered-off first devices; and controlling the second device to establish a connection with the wireless network node through the data network connection module.

3. The method of claim 1, wherein the device establishing a connection with the wireless network node is configured to acquire data from the Internet via the wireless network node.

4. The method of claim 3, wherein the plurality of devices are configured to share the data acquired via the wireless network node through the Bluetooth network.

5. The method of claim 1, wherein the data network connection module is a WIFI connection module having a WIFI connection function, and the wireless network node is a WIFI router.

6. The method of claim 1, wherein the data network connection module is a connection module having at least one connection function of 4G, 5G, NB-IoT, and LoRa, and the wireless network node is a communication base station.

7. A storage medium, comprising a stored program, wherein when the program is run, a device where the storage medium is located is controlled to perform the method of claim 1.

8. A processor, configured to run a program, wherein the program is run to perform the method of claim 1.

9. A terminal, comprising: one or more processors, a memory, and one or more programs, wherein the one or more programs are stored in the memory, and configured to be executed by the one or more processors, and when executed, the one or more programs cause the one or more processors to perform the method of claim 1.

10. A device control apparatus, comprising:

a device detection module, configured to detect a plurality of devices, wherein each of the plurality of devices has a data network connection module and a Bluetooth connection module, each device is capable of establishing a connection with a wireless network node through the respective data network connection module, and the plurality of devices are connected to each other in a Bluetooth network through the respective Bluetooth connection modules;

a signal strength acquisition module, configured to acquire the signal strength of each device in the plurality of devices to establish a connection with the wireless network node through the respective data network connection modules;

a connection device determination module, configured to determine one or more first devices in the plurality of devices with the highest signal strength to establish a connection with the wireless network node through the respective data network connection modules;

a connection control module, configured to control the one or more first devices to establish a connection with the wireless network node through the data network connection module; and a data network control module, configured to deactivate or idle the data network connection modules of other devices than the first device in the plurality of devices.

11. The apparatus of claim 10, further comprising:

a power-off detection module, configured to detect, after the one or more first devices establish a connection with the wireless network node, whether at least one of the one or more first devices is powered off, wherein if the at least one first device is powered off, the connection device determination module determines at least one second device with the highest signal strength to establish a connection with the wireless network node through the respective data network connection modules among devices other than the powered-off first devices in the plurality of devices, the number of the determined second devices being equal to that of the powered-off first devices; and the connection control module controls the second device to establish a connection with the wireless network node through the data network connection module.

12. The apparatus of claim 10, wherein the device establishing a connection with the wireless network node is configured to acquire data from the Internet via the wireless network node.

13. The apparatus of claim 12, wherein the plurality of devices are configured to share the data acquired via the wireless network node through the Bluetooth network.

14. The apparatus of claim 10, wherein the data network connection module is a WIFI connection module having a WIFI connection function, and the wireless network node is a WIFI router.

15. The apparatus of claim 10, wherein the data network connection module is a connection module having at least one connection function of 4G, 5G, NB-IoT, and LoRa, and the wireless network node is a communication base station.

* * * * *